US011602213B1

(12) United States Patent
Leach et al.

(10) Patent No.: US 11,602,213 B1
(45) Date of Patent: Mar. 14, 2023

(54) PLATFORM ASSEMBLY FOR ATTACHMENT TO A TREE

(71) Applicant: Latitude Outdoors, LLC, Grand Rapids, MI (US)

(72) Inventors: Kevin Leach, Grand Rapids, MI (US); Alex Chopp, Royal Oak, MI (US); Jake Matelic, Royal Oak, MI (US)

(73) Assignee: Latitude Outdoors, LLC, Grand Rapids, MI (US)

( * ) Notice: Subject to any disclaimer, the term of this patent is extended or adjusted under 35 U.S.C. 154(b) by 0 days.

(21) Appl. No.: 17/821,262

(22) Filed: Aug. 22, 2022

(51) Int. Cl.
*A01M 31/02* (2006.01)
*A45F 3/26* (2006.01)
*F16M 13/02* (2006.01)

(52) U.S. Cl.
CPC ............... *A45F 3/26* (2013.01); *A01M 31/02* (2013.01); *F16M 13/022* (2013.01)

(58) Field of Classification Search
CPC ......... A45F 3/26; F16M 13/022; A01M 31/02
See application file for complete search history.

(56) References Cited

U.S. PATENT DOCUMENTS

| 4,601,364 A | 7/1986 | York |
| 4,869,520 A | 9/1989 | Cole |
| 5,060,756 A | 10/1991 | D'Acquisto |
| 8,789,653 B2 * | 7/2014 | Priest ............... A01M 31/02 182/100 |
| D719,680 S | 12/2014 | Priest |
| 8,997,933 B2 | 4/2015 | Furseth et al. |
| 9,027,709 B2 * | 5/2015 | Wheelington ........ A01M 31/02 182/129 |
| 9,204,628 B2 | 12/2015 | Priest |
| D760,916 S | 7/2016 | Schlipf |
| 10,791,729 B1 * | 10/2020 | Power, II ............... F16M 13/02 |
| 11,154,048 B2 | 10/2021 | Power, II et al. |
| 11,317,622 B2 * | 5/2022 | Power, II ............. A01M 31/02 |
| 11,330,813 B2 * | 5/2022 | Power, II ............... F16M 13/02 |
| 2006/0054397 A1 * | 3/2006 | Pringnitz ............. A01M 31/02 182/187 |

* cited by examiner

Primary Examiner — Todd M Epps

(74) Attorney, Agent, or Firm — Price Heneveld LLP

(57) ABSTRACT

A platform assembly for attachment to a tree includes a platform and a post. The platform has an outer perimeter that bounds an interior structure of the platform that is horizontally-inboard of the outer perimeter. The outer perimeter includes a rear portion, a first wing portion coupled to the rear portion at a first wing portion rear corner and including an outboard-most portion of the outer perimeter in a first lateral direction, a front portion coupled to the first wing portion, and a second wing portion coupled to the front portion. The post is coupled to the platform and pivots relative to the platform about a pivot axis.

20 Claims, 6 Drawing Sheets

PLATFORM ASSEMBLY FOR ATTACHMENT TO A TREE

FIELD OF THE DISCLOSURE

The present disclosure generally relates to a platform assembly for attachment to a tree. More specifically, the present disclosure relates to a platform assembly having an outer perimeter that includes a first wing portion and a second wing portion.

BACKGROUND OF THE DISCLOSURE

Tree stand platforms are often used for hunting.

SUMMARY OF THE DISCLOSURE

According to an aspect of the present disclosure, a platform assembly for attachment to a tree includes a platform. The platform has an outer perimeter that bounds an interior structure of the platform that is horizontally-inboard of the outer perimeter. The outer perimeter includes a rear portion, a first wing portion coupled to the rear portion at a first wing portion rear corner and including an outboard-most portion of the outer perimeter in a first lateral direction, a front portion coupled to the first wing portion at a first wing portion front corner, and a second wing portion coupled to the front portion at a second wing portion front corner and coupled to the rear portion at a second wing portion rear corner. The second wing portion includes an outboard-most portion of the outer perimeter in a second lateral direction that is opposite the first lateral direction. The first wing portion includes a rear section that extends from the first wing portion rear corner to the outboard-most portion of the outer perimeter in the first lateral direction. The platform assembly further includes a post. The post is coupled to the platform and is operable to pivot relative to the platform about a pivot axis that is parallel to the first and second lateral directions. At least a majority of the rear section of the first wing portion is positioned forward of the pivot axis.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 3:
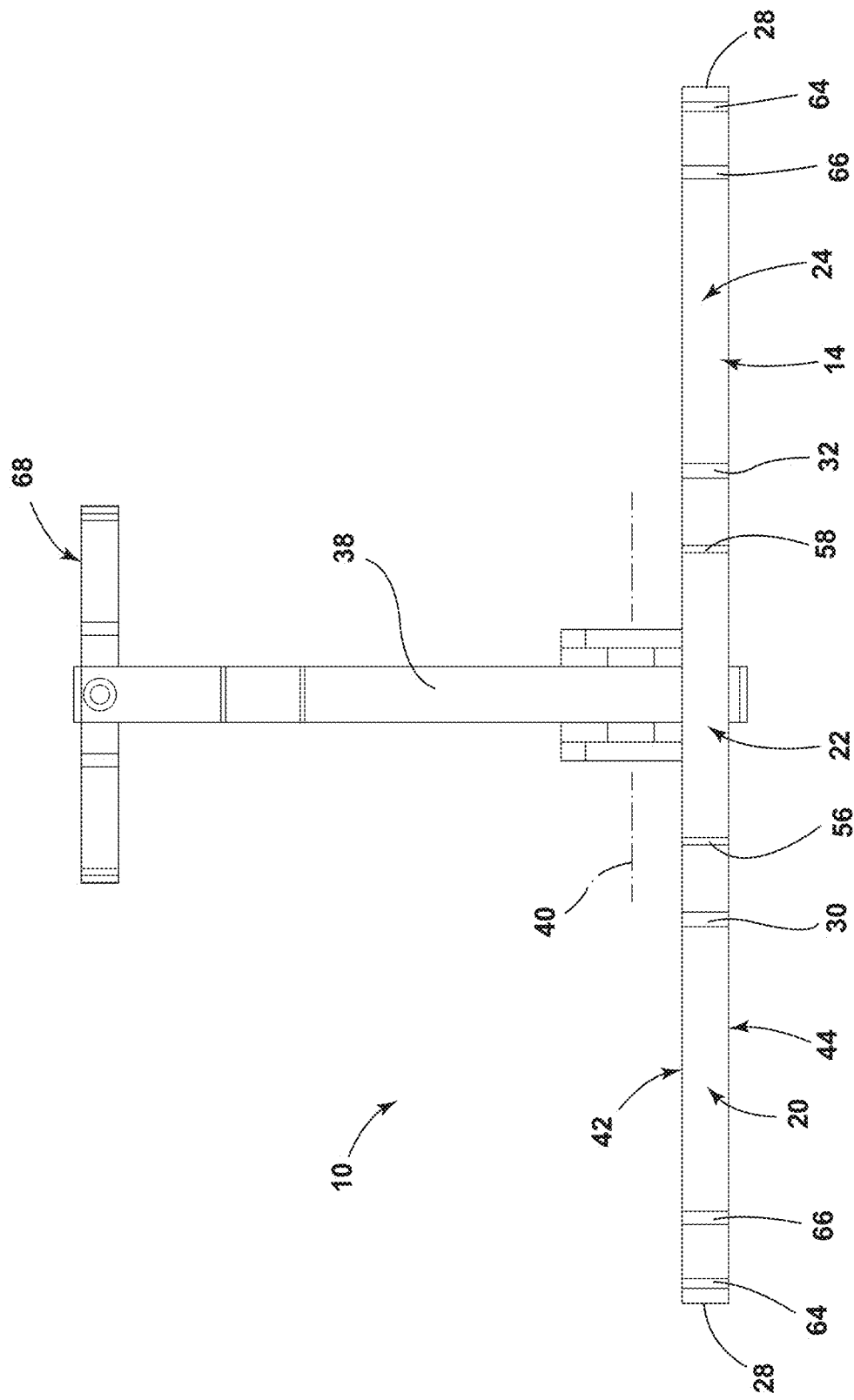
FIG. 3 is a front elevational view of the platform assembly illustrating a front portion of the outer perimeter and first and second wing portions of the outer perimeter.

For purposes of description herein, the terms "upper," "lower," "right," "left," "lateral," "rear," "front," "vertical," "horizontal," "upward," "downward" and derivatives thereof shall relate to the disclosure as oriented in FIG. 3. Unless stated otherwise, the term "front" shall refer to closer to an intended viewer, and the term "rear" shall refer to further from the intended viewer. Unless stated otherwise, the term "forward" shall refer to toward the intended viewer and/or closer to the intended viewer based on the context. For example, the phrase "extending forward" shall be interpreted as extending toward the intended viewer, while a first element being "forward of" a second element shall refer to the first element being closer than the second element to the intended viewer. Unless stated otherwise, the term "rearward" shall refer to away from the intended viewer and/or further from the intended viewer based on the context. For example, the phrase "extending rearward" shall be interpreted as extending away from the intended viewer, while a first element being "rearward of" a second element shall refer to the first element being further than the second element from the intended viewer. Unless stated otherwise, the term "lateral" and derivatives thereof shall refer to left-right directions. Further, unless stated otherwise, the term "horizontal" shall refer to forward, rearward, left, right, and/or combinations thereof. However, it is to be understood that the disclosure may assume various alternative orientations, except where expressly specified to the contrary. It is also to be understood that the specific devices illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-6, a platform assembly 10 for attachment to a tree includes a platform 12. The platform 12 includes an outer perimeter 14. The outer perimeter 14 bounds an interior structure 16 of the platform 12 that is horizontally-inboard of the outer perimeter 14. The outer perimeter 14 includes a rear portion 18, a first wing portion 20, a front portion 22, and a second wing portion 24. The first wing portion 20 is coupled to the rear portion 18 at a first wing portion rear corner 26. The first wing portion 20 includes an outboard-most portion 28 of the outer perimeter 14 in a first lateral direction. The front portion 22 is coupled to the first wing portion 20 at a first wing portion front corner 30. The second wing portion 24 is coupled to the front portion 22 at a second wing portion front corner 32 and is coupled to the rear portion 18 at a second wing portion rear corner 34. The second wing portion 24 includes an outboard-most portion 28 of the outer perimeter 14 in a second lateral direction that is opposite the first lateral direction. The first wing portion 20 includes a rear section 36 that extends from the first wing portion rear corner 26 to the outboard-most portion 28 of the outer perimeter 14 in the first lateral direction. A post 38 is coupled to the platform 12 and is operable to pivot relative to the platform 12 about a pivot axis 40. The pivot axis 40 is parallel to the first and second lateral directions. At least a majority of the rear section 36 is positioned forward of the pivot axis 40.

Figure 1:
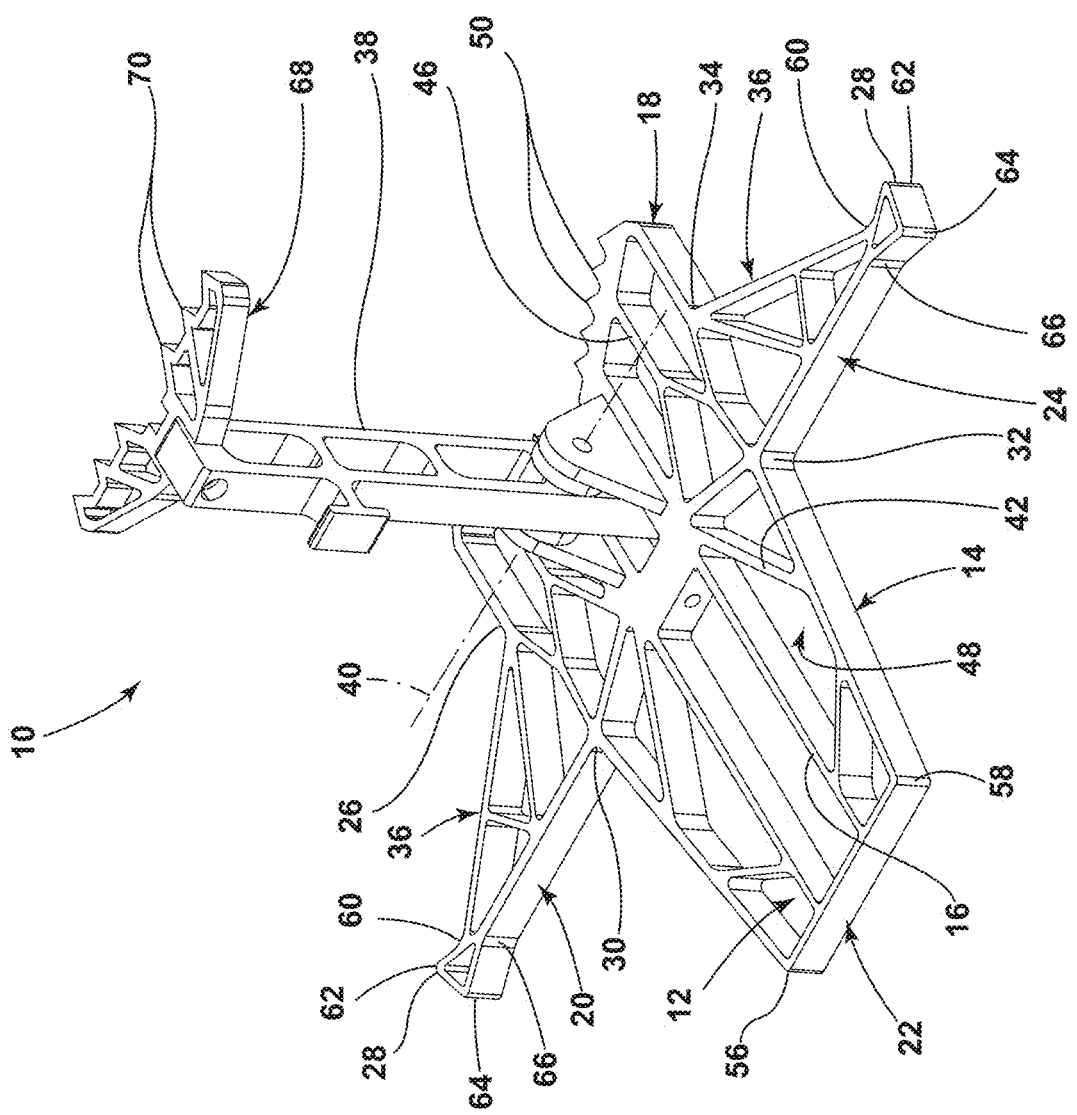
FIG. 1 is a top perspective view of a platform assembly that includes a platform having an outer perimeter and a post pivotably coupled to the platform and positioned in a deployed position.
Figure 4:
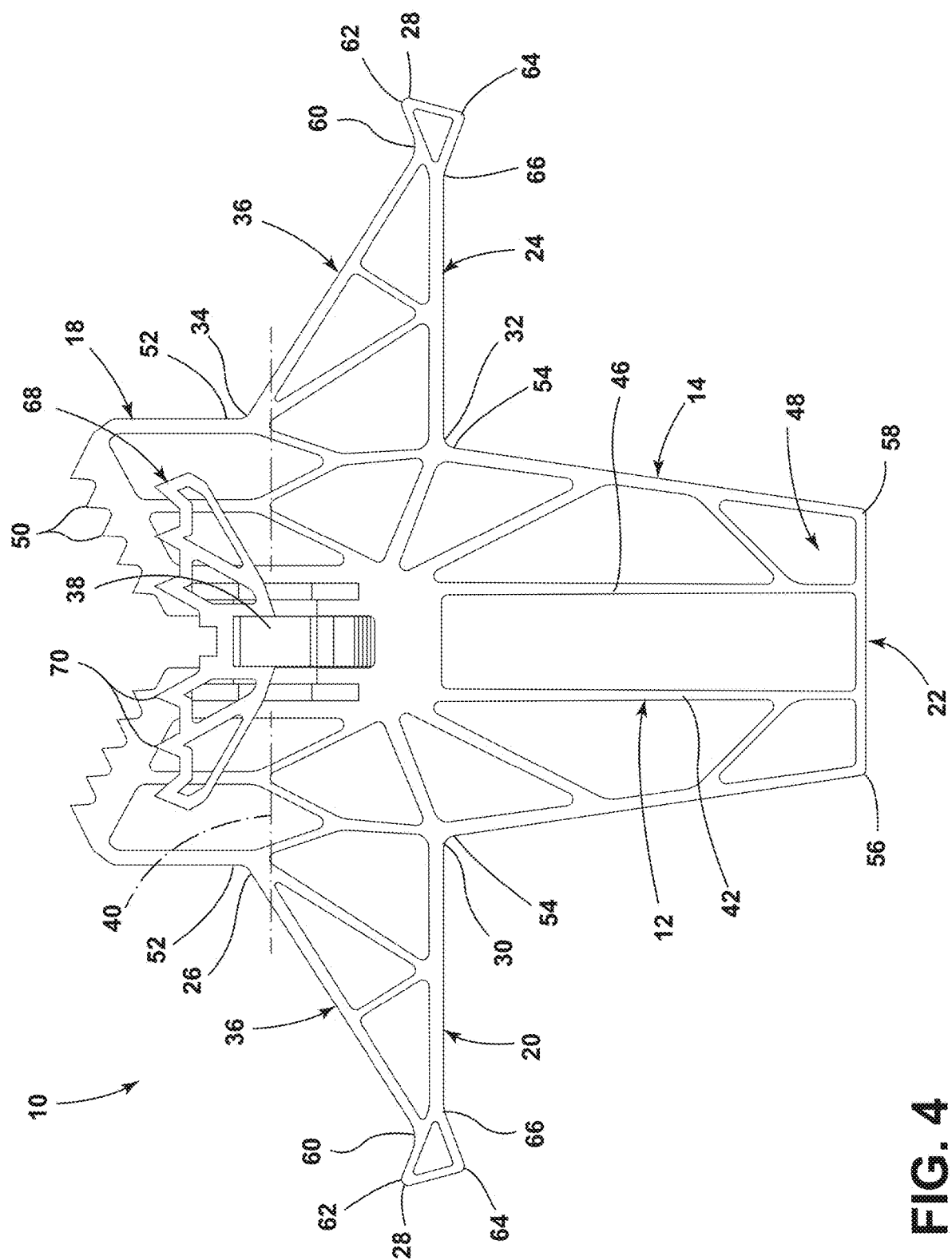
FIG. 4 is a plan view of the platform assembly, illustrating the outer perimeter of the platform which includes the front portion, the first wing portion, the second wing portion, and the rear portion.

Referring now to FIGS. 1, 3, and 4, the platform assembly 10 includes the platform 12. The platform 12 includes the outer perimeter 14 and the interior structure 16. As illustrated in FIGS. 1 and 4, the interior structure 16 of the platform 12 is horizontally-inboard of the outer perimeter 14, and the outer perimeter 14 bounds the interior structure 16. As illustrated in FIGS. 1 and 4, the outer perimeter 14 faces horizontally outward away from the interior structure 16. In various implementations, the interior structure 16 forms an upper support portion 42 of the platform 12 that is configured to support a user standing on the upper support portion 42 of the platform 12. The interior structure 16 of the platform 12 further includes an underside portion 44 that is opposite the upper support portion 42. As illustrated in FIG. 3, the outer perimeter 14 extends between the upper support portion 42 and the underside portion 44 of the platform 12. In the embodiment illustrated in FIGS. 1 and 4, the interior structure 16 of the platform 12 includes a plurality of cross members 46 that cooperate to define a plurality of apertures 48 and form the upper support portion 42 and underside portion 44 of the platform 12. It is contemplated that the interior structure 16 of the platform 12 can be configured in a variety of ways, in various implementations. For example, in some embodiments, the interior structure 16 of the platform 12 can be a solid panel that does not define apertures.

Referring now to FIGS. 1-4, the outer perimeter 14 includes the rear portion 18, the first wing portion 20, the front portion 22, and the second wing portion 24. As illustrated in FIG. 4, the first wing portion 20 is coupled to the rear portion 18 at a first wing portion rear corner 26, the front portion 22 is coupled to the first wing portion 20 at the first wing portion front corner 30, and the second wing portion 24 is coupled to the front portion 22 at the second wing portion front corner 32 and is coupled to the rear portion 18 at the second wing portion rear corner 34. In the embodiment illustrated in FIGS. 1-4, the first wing portion front corner 30 is a reentrant corner and the first wing portion rear corner 26 is a reentrant corner. A reentrant corner of the outer perimeter 14 can be concave. In other words, a reentrant corner of the outer perimeter 14 can be a rounded reentrant corner. Further, a salient corner of the outer perimeter 14 can be a convex corner. In other words, a salient corner of the outer perimeter 14 can be a rounded salient corner, in some implementations. As further illustrated in FIG. 4, the second wing portion front corner 32 and the second wing portion rear corner 34 can be reentrant corners.

Referring now to FIG. 4, the rear portion 18 of the outer perimeter 14 extends from the first wing portion rear corner 26 to the second wing portion rear corner 34. The rear portion 18 of the outer perimeter 14 forms a plurality of rearwardly extending teeth 50 that are configured to engage the tree to which the platform assembly 10 is mounted. As illustrated in FIG. 4, the outboard-most portion 52 of the rear portion 18 of the outer perimeter 14 in the first lateral direction is immediately adjacent to the first wing portion rear corner 26. Further, the outboard-most portion 52 of the rear portion 18 of the outer perimeter 14 in the second lateral direction that is opposite the first lateral direction is immediately adjacent to the second wing portion rear corner 34. In the embodiment illustrated in FIG. 4, the first lateral direction corresponds with the horizontally left direction and the second lateral direction corresponds with the horizontally right direction. It is contemplated that the first lateral direction can correspond with the horizontally right direction and the second lateral direction can correspond with the horizontally left direction, in some implementations.

Referring still to FIG. 4, the outboard-most portion 54 of the front portion 22 of the outer perimeter 14 in the first lateral direction can be immediately adjacent to the first wing portion front corner 30. Further, the outboard-most portion 54 of the front portion 22 of the outer perimeter 14 in the second lateral direction can be immediately adjacent to the second wing portion front corner 32, as illustrated in FIG. 4. In the embodiment illustrated in FIG. 4, the front portion 22 of the outer perimeter 14 extends forward and laterally-inboard from the reentrant first wing portion front corner 30 to a first salient corner 56 of the front portion 22, laterally across in the second lateral direction to a second salient corner 58 of the front portion 22, and laterally outboard and rearward from the second salient corner 58 of the front portion 22 to the reentrant second wing portion front corner 32 of the outer perimeter 14. It is contemplated that the front portion 22 of the platform assembly 10 can have a variety of shapes and varying numbers of corners.

Referring still to FIG. 4, in various embodiments, the first wing portion 20 includes the outboard-most portion 28 of the outer perimeter 14 in the first lateral direction. Further, the second wing portion 24 includes the outboard-most portion 28 of the outer perimeter 14 in the second lateral direction. In various embodiments, the first wing portion 20 includes the rear section 36 that extends from the first wing portion rear corner 26 to the outboard-most portion 28 of the outer perimeter 14 in the first lateral direction. In other words, in the embodiment illustrated in FIG. 4, the rear section 36 of the first wing portion 20 extends from the first wing portion rear corner 26 to the leftward-most portion of the first wing portion 20. In various embodiments, the second wing portion 24 includes the rear section 36 that extends from the second wing portion rear corner 34 to the outboard-most portion 28 of the outer perimeter 14 in the second lateral direction. In some implementations, the rear section 36 of the first wing portion 20 forms a rear section corner 60 that is disposed between the outboard-most portion 28 of the outer perimeter 14 in the first lateral direction and the first wing portion rear corner 26. As illustrated in FIG. 4, the rear section corner 60 is a reentrant corner. In some implementations, the outboard-most portion 28 of the outer perimeter 14 in the first lateral direction is positioned rearward of the rear section corner 60 of the first wing portion 20. As further illustrated in FIG. 4, the rear section 36 of the second wing portion 24 forms a rear section corner 60 that is disposed between the outboard-most portion 28 of the outer perimeter 14 in the second lateral direction and the second wing portion rear corner 34. The rear section corner 60 of the second wing portion 24 is a reentrant corner. In some implementations, the outboard-most portion 28 of the outer perimeter 14 in the first lateral direction is nearer than the first wing portion rear corner 26 to the rear section corner 60 of the first wing portion 20 of the outer perimeter 14. Further, the outboard-most portion 28 of the outer perimeter 14 in the second lateral direction can be nearer than the second wing portion rear corner 34 to the rear section corner 60 of the second wing portion 24 of the outer perimeter 14.

In the embodiment illustrated in FIG. 4, the first wing portion 20 of the outer perimeter 14 extends from the reentrant first wing portion rear corner 26 forward and laterally-outboard to the reentrant rear section corner 60 of the first wing portion 20. The first wing portion 20 further extends from the reentrant rear section corner 60 laterally-outboard and rearward to a first salient corner 62 of the first wing portion 20 that forms the outboard-most portion 28 of the outer perimeter 14 in the first lateral direction. The first wing portion 20 extends from the first salient corner 62 of the first wing portion 20 forward and laterally-inboard to a second salient corner 64 of the first wing portion 20. The first wing portion 20 extends from the second salient corner 64 of the first wing portion 20 rearward and laterally-inboard to a front reentrant corner 66 of the first wing portion 20. The first wing portion 20 extends from the front reentrant corner 66 of the first wing portion 20 to the reentrant first wing portion front corner 30.

As further illustrated in FIG. 4, the second wing portion 24 of the outer perimeter 14 extends from the reentrant second wing portion rear corner 34 forward and laterally-outboard to the reentrant rear section corner 60 of the second wing portion 24. The second wing portion 24 further extends from the reentrant rear section corner 60 laterally-outboard and rearward to the first salient corner 62 of the second wing portion 24 that forms the outboard-most portion 28 of the outer perimeter 14 in the second lateral direction. The second wing portion 24 extends from the first salient corner 62 of the second wing portion 24 forward and laterally-inboard to the second salient corner 64 of the second wing portion 24. The first wing portion 20 extends from the second salient corner 64 of the second wing portion 24 rearward and laterally-inboard to the front reentrant corner 66 of the second wing portion 24. The second wing portion 24 extends from the front reentrant corner 66 of the second wing portion 24 to the reentrant second wing portion front corner 32.

Referring still to FIG. 4, the outboard-most portion 28 of the outer perimeter 14 in the first lateral direction can be a first distance from the outboard-most portion 28 of the outer perimeter 14 in the second lateral direction, and the outboard-most portion 54 of the front portion 22 of the outer perimeter 14 in the first lateral direction can be a second distance from the outboard-most portion 54 of the front portion 22 of the outer perimeter 14 in the second lateral direction. As illustrated in FIG. 4, the first distance is greater than the second distance. In various implementations, the first distance is at least twice as long as the second distance. In various implementations, the outboard-most portion 52 of the rear portion 18 of the outer perimeter 14 in the first lateral direction can be a third distance from the outboard-most portion 52 of the rear portion 18 of the outer perimeter 14 in the second lateral direction. As illustrated in FIG. 4, the first distance is greater than the third distance. In various implementations, the first distance can be at least twice as long as the third distance. In the embodiment illustrated in FIG. 4, the third distance is greater than the second distance.

Figure 2:
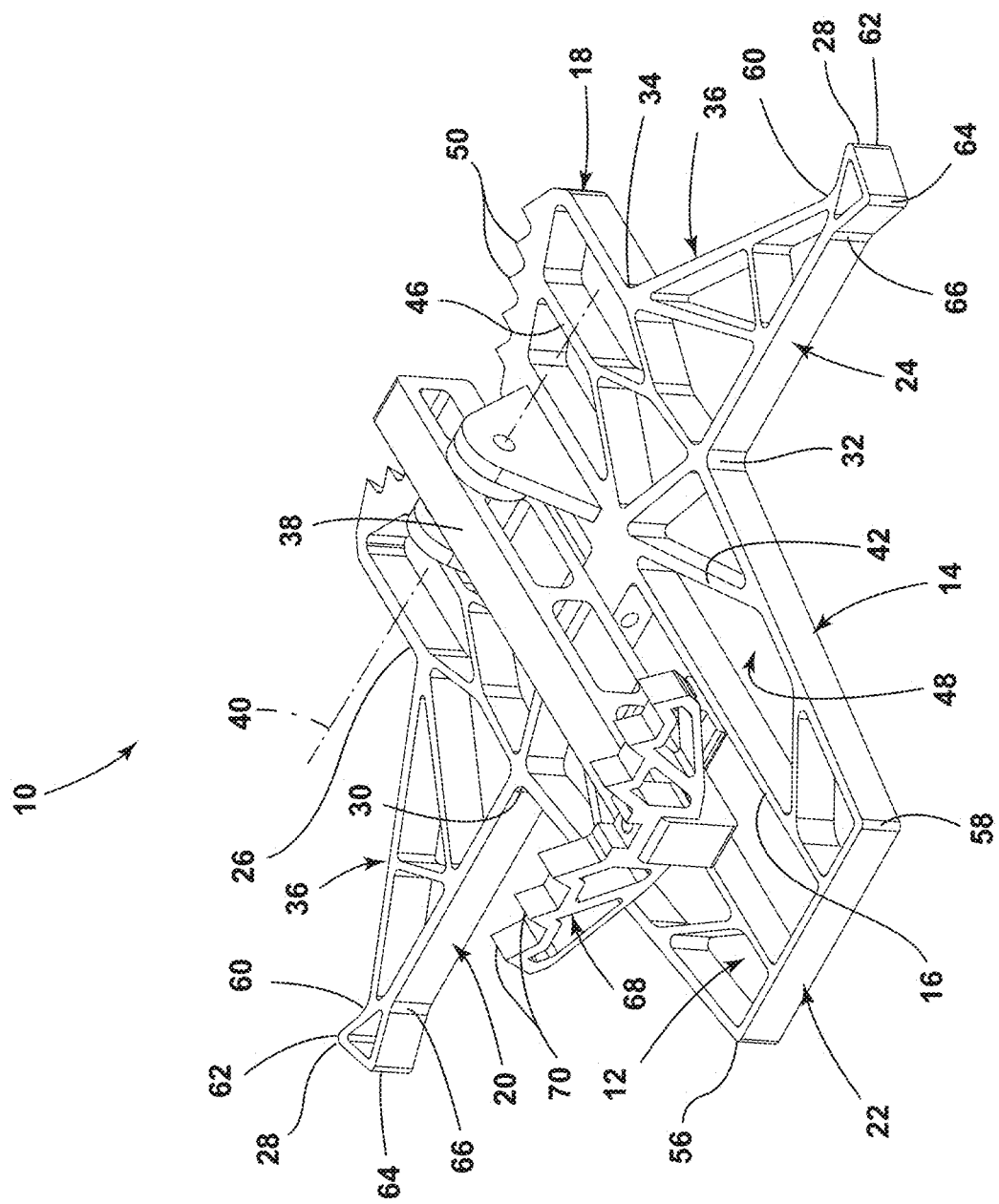
FIG. 2 is a top perspective view of the platform assembly illustrating the platform and the post in a stowed position.
Figure 5:
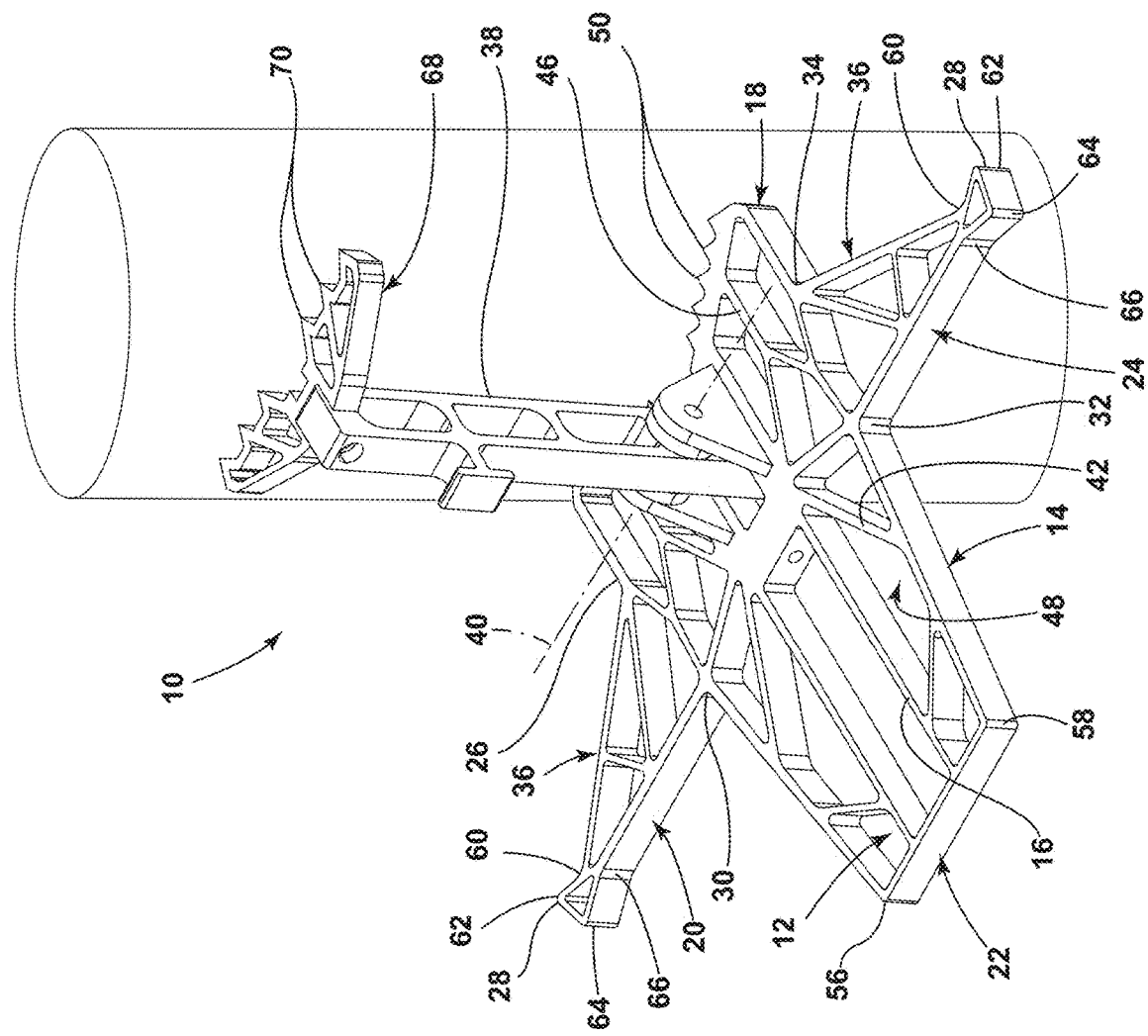
FIG. 5 is a top perspective view of the platform assembly illustrating the platform assembly coupled to a tree.
Figure 6:
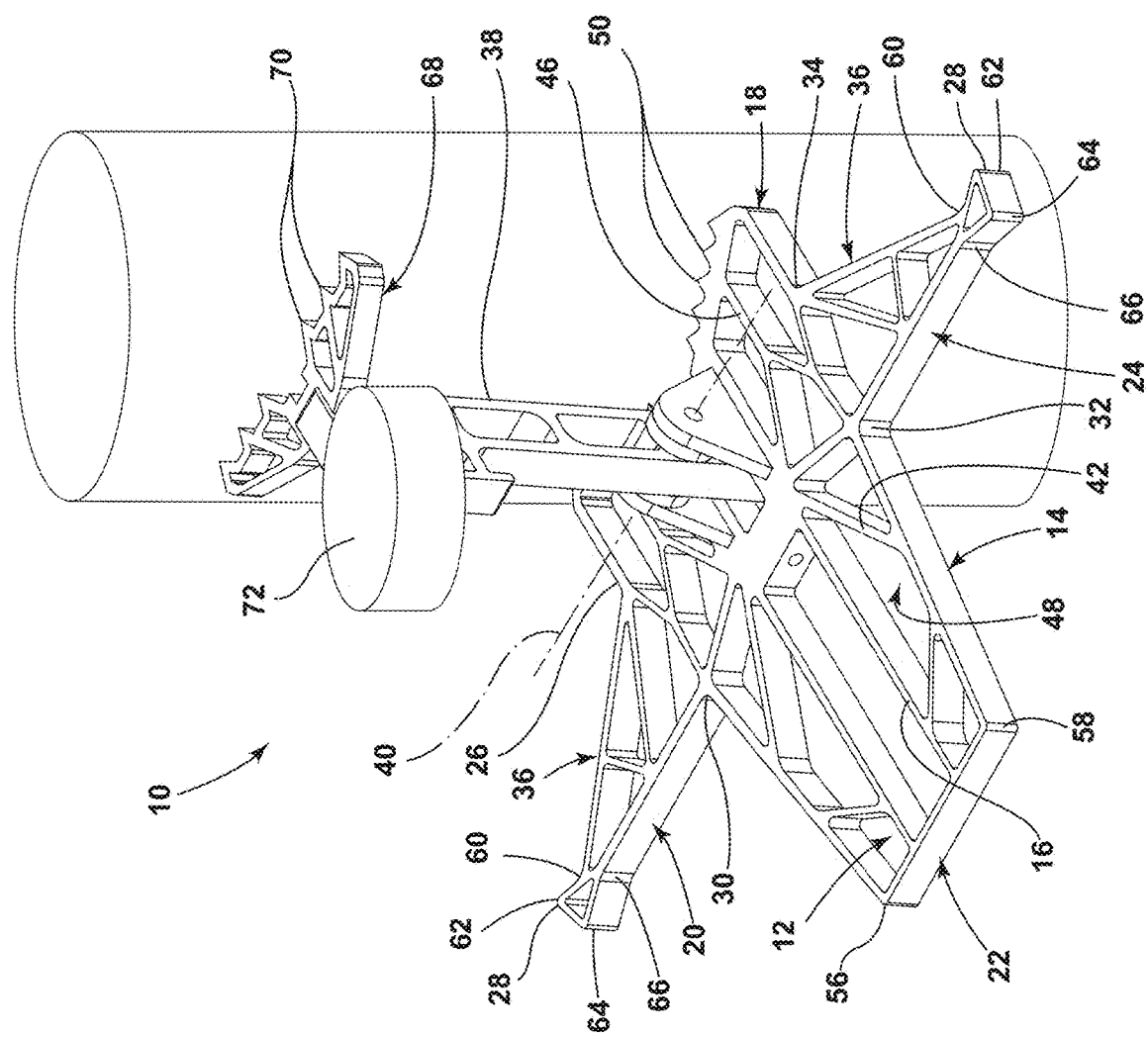
FIG. 6 is a top perspective view of the platform assembly including a seat coupled to the post, wherein the platform assembly is coupled to a tree.

Referring now to FIGS. 1-6, the platform assembly 10 can include the post 38. The post 38 is coupled to the platform 12 and is operable to pivot relative to the platform 12 about the pivot axis 40. In the embodiment illustrated in FIGS. 1-4, the pivot axis 40 is parallel to the first and second lateral directions. In various embodiments, the post 38 is operable to pivot relative to the platform 12 about the pivot axis 40 between a deployed position, as illustrated in FIGS. 1 and 3-6, and a stowed position, as illustrated in FIG. 2. In various implementations, a standoff 68 is coupled to the post 38. The standoff 68 can include a plurality of standoff teeth 70 that are configured to engage the tree in the deployed position of the post 38, as illustrated in FIGS. 5 and 6. As illustrated in FIG. 6, in some embodiments, a seat 72 can be coupled to the post 38. The seat 72 can support a seated user, while the platform 12 provides support for the feet of the seated user.

Referring now to FIGS. 1-4, in various implementations, at least a majority of the rear section 36 of the first wing portion 20 of the outer perimeter 14 is positioned forward of the pivot axis 40. Further, at least a majority of the rear section 36 of the second wing portion 24 can be positioned forward of the pivot axis 40. In some implementations, the entirety of the rear section 36 of the first wing portion 20 and/or the entirety of the rear section 36 of the second wing portion 24 is positioned forward of the pivot axis 40. In the embodiment illustrated in FIG. 4, a majority of the rear section 36 of the first wing portion 20 of the outer perimeter 14 is positioned forward of the pivot axis 40, and a portion of the rear section 36 of the first wing portion 20 is positioned rearward of the pivot axis 40. Further, a majority of the rear section 36 of the second wing portion 24 of the outer perimeter 14 is positioned forward of the pivot axis 40, and a portion of the rear section 36 of the second wing portion 24 is positioned rearward of the pivot axis 40. In the illustrated embodiment, the first wing portion rear corner 26 and the second wing portion rear corner 34 are positioned rearward of the pivot axis 40 about which the post 38 pivots between the deployed and stowed positions.

In operation of an exemplary embodiment of the platform assembly 10, a user mounts the platform assembly 10 to a tree with the post 38 in the deployed position, as illustrated in FIG. 5. Next, the user secures himself to the tree with a safety harness and steps onto the platform 12. Next, the user, while securely tethered to the tree via the safety harness, steps out onto the first wing portion 20 of the outer perimeter 14 to gain a better vantage point of the areas rearward of the tree.

The platform assembly 10 of the present disclosure can provide a variety of advantages. First, the first and second wing portions 20, 24 of the outer perimeter 14 can provide footholds for a user supported by the platform assembly 10 that increase the lateral mobility of the user on the platform 12. Second, the majority of the rear sections 36 of the first and second wing portions 20, 24 being positioned forward of the pivot axis 40 can ensure that the platform 12 does not undesirably pivot relative to the post 38 during use.

According to an aspect of the present disclosure, a platform assembly for attachment to a tree includes a platform. The platform has an outer perimeter that bounds an interior structure of the platform that is horizontally-inboard of the outer perimeter. The outer perimeter includes a rear portion, a first wing portion coupled to the rear portion at a first wing portion rear corner and including an outboard-most portion of the outer perimeter in a first lateral direction, a front portion coupled to the first wing portion at a first wing portion front corner, and a second wing portion coupled to the front portion at a second wing portion front corner and coupled to the rear portion at a second wing portion rear corner. The second wing portion includes an outboard-most portion of the outer perimeter in a second lateral direction that is opposite the first lateral direction. The first wing portion includes a rear section that extends from the first wing portion rear corner to the outboard-most portion of the outer perimeter in the first lateral direction. The platform assembly further includes a post. The post is coupled to the platform and is operable to pivot relative to the platform about a pivot axis that is parallel to the first and second lateral directions. At least a majority of the rear section of the first wing portion is positioned forward of the pivot axis.

According to another aspect, the first wing portion front corner is a reentrant corner and the first wing portion rear corner is a reentrant corner.

According to another aspect, a portion of the rear section of the first wing portion is positioned rearward of the pivot axis.

According to another aspect, the second wing portion includes a rear section that extends from the second wing portion rear corner to the outboard-most portion of the outer perimeter in the second lateral direction. At least a majority of the rear section of the second wing portion is positioned forward of the pivot axis.

According to another aspect, a portion of the rear section of the second wing portion is positioned rearward of the pivot axis.

According to another aspect, the second wing portion front corner is a reentrant corner and the second wing portion rear corner is a reentrant corner.

According to another aspect, the rear portion forms a plurality of rearwardly extending teeth configured to engage the tree.

According to another aspect, the outboard-most portion of the front portion of the outer perimeter in the first lateral direction is immediately adjacent to the first wing portion front corner.

According to another aspect, the outboard-most portion of the front portion of the outer perimeter in the second lateral direction is immediately adjacent to the second wing portion front corner.

According to another aspect, the outboard-most portion of the outer perimeter in the first lateral direction is a first distance from the outboard-most portion of the outer perimeter in the second lateral direction, and the outboard-most portion of the front portion of the outer perimeter in the first lateral direction is a second distance from the outboard-most portion of the front portion of the outer perimeter in the second lateral direction. The first distance is at least twice as long as the second distance.

According to another aspect, the outboard-most portion of the rear portion of the outer perimeter in the first lateral direction is a third distance from the outboard-most portion of the rear portion of the outer perimeter in the second lateral direction. The first distance is at least twice as long as the third distance.

According to another aspect, the third distance is greater than the second distance.

According to another aspect, the outboard-most portion of the rear portion of the outer perimeter in the first lateral direction is immediately adjacent to the first wing portion rear corner.

According to another aspect, the outboard-most portion of the rear portion of the outer perimeter in the second lateral direction is immediately adjacent to the second wing portion rear corner.

According to another aspect, a standoff is coupled to the post and has a plurality of standoff teeth configured to engage the tree.

According to another aspect, a seat is coupled to the post and extends forward therefrom.

According to another aspect, the rear section of the first wing portion forms a rear section corner between the outboard-most portion of the outer perimeter in the first lateral direction and the first wing portion rear corner.

According to another aspect, the rear section corner is a reentrant corner.

According to another aspect, the outboard-most portion of the outer perimeter in the first lateral direction is positioned rearward of the rear section corner.

According to another aspect, the outboard-most portion of the outer perimeter in the first lateral direction is nearer than the first wing portion rear corner to the rear section corner.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A platform assembly for attachment to a tree, comprising:
   a platform having an outer perimeter that bounds an interior structure of the platform that is horizontally-inboard of the outer perimeter, the outer perimeter comprising:
   a rear portion;
   a first wing portion coupled to the rear portion at a first wing portion rear corner, wherein the first wing portion includes an outboard-most portion of the outer perimeter in a first lateral direction, and wherein the first wing portion includes a rear section that extends from the first wing portion rear corner to the outboard-most portion of the outer perimeter in the first lateral direction;
   a front portion coupled to the first wing portion at a first wing portion front corner; and a second wing portion coupled to the front portion at a second wing portion front corner and coupled to the rear portion at a second wing portion rear corner, and the second wing portion includes an outboard-most portion of the outer perimeter in a second lateral direction that is opposite the first lateral direction; and a post coupled to the platform and operable to pivot relative to the platform about a pivot axis that is parallel to the first and second lateral directions, wherein at least a majority of the rear section of the first wing portion is positioned forward of the pivot axis.

2. The platform assembly of claim 1, wherein the first wing portion front corner is a reentrant corner and the first wing portion rear corner is a reentrant corner.

3. The platform assembly of claim 1, wherein a portion of the rear section of the first wing portion is positioned rearward of the pivot axis.

4. The platform assembly of claim 1, wherein the second wing portion includes a rear section that extends from the second wing portion rear corner to the outboard-most portion of the outer perimeter in the second lateral direction, and wherein at least a majority of the rear section of the second wing portion is positioned forward of the pivot axis.

5. The platform assembly of claim 4, wherein a portion of the rear section of the second wing portion is positioned rearward of the pivot axis.

6. The platform assembly of claim 5, wherein the second wing portion front corner is a reentrant corner and the second wing portion rear corner is a reentrant corner.

7. The platform assembly of claim 1, wherein the rear portion forms a plurality of rearwardly extending teeth configured to engage the tree.

8. The platform assembly of claim 1, wherein the outboard-most portion of the front portion of the outer perimeter in the first lateral direction is immediately adjacent to the first wing portion front corner.

9. The platform assembly of claim 8, wherein the outboard-most portion of the front portion of the outer perimeter in the second lateral direction is immediately adjacent to the second wing portion front corner.

10. The platform assembly of claim 1, wherein the outboard-most portion of the outer perimeter in the first lateral direction is a first distance from the outboard-most portion of the outer perimeter in the second lateral direction, and the outboard-most portion of the front portion of the outer perimeter in the first lateral direction is a second distance from the outboard-most portion of the front portion of the outer perimeter in the second lateral direction, wherein the first distance is at least twice as long as the second distance.

11. The platform assembly of claim 10, wherein the outboard-most portion of the rear portion of the outer perimeter in the first lateral direction is a third distance from the outboard-most portion of the rear portion of the outer perimeter in the second lateral direction, wherein the first distance is at least twice as long as the third distance.

12. The platform assembly of claim 11, wherein the third distance is greater than the second distance.

13. The platform assembly of claim 1, wherein the outboard-most portion of the rear portion of the outer perimeter in the first lateral direction is immediately adjacent to the first wing portion rear corner.

14. The platform assembly of claim 13, wherein the outboard-most portion of the rear portion of the outer perimeter in the second lateral direction is immediately adjacent to the second wing portion rear corner.

15. The platform assembly of claim 1, further comprising:
a standoff coupled to the post and having a plurality of standoff teeth configured to engage the tree.

16. The platform assembly of claim 15, further comprising:
a seat coupled to the post and extending forward therefrom.

17. The platform assembly of claim 1, wherein the rear section of the first wing portion forms a rear section corner between the outboard-most portion of the outer perimeter in the first lateral direction and the first wing portion rear corner.

18. The platform assembly of claim 17, wherein the rear section corner is a reentrant corner.

19. The platform assembly of claim 18, wherein the outboard-most portion of the outer perimeter in the first lateral direction is positioned rearward of the rear section corner.

20. The platform assembly of claim 19, wherein the outboard-most portion of the outer perimeter in the first lateral direction is nearer than the first wing portion rear corner to the rear section corner.

* * * * *